United States Patent Office 2,795,625
Patented June 11, 1957

2,795,625

PREPARATION OF DI-GRIGNARD ORGANO-METALLIC DERIVATIVES

John F. Nobis, Cincinnati, Ohio, and Robert E. Robinson, Ludlow, Ky., assignors to National Distillers and Chemical Corporation, New York, N. Y., a corporation of Virginia No Drawing. Application April 14, 1954,
Serial No. 423,207

18 Claims. (Cl. 260—665)

This invention relates generally to a novel method for the preparation of bis-halomagnesio compounds and, more particularly, to the production of aliphatic unsaturated di-Grignard reagents by the dimerization of selected olefinic reactants in the presence of an alkali metal and a solid, anhydrous, reactive magnesium halide. Specifically, the process relates to improvements wherein unsaturated hydrocarbons such as aliphatic conjugated diolefins undergo dimerization and reaction in the presence of finely divided sodium metal and a magnesium halide to give di-halomagnesium derivatives of the dimers.

It is known to carry out various types of reactions in which organo-sodium compounds are prepared. One particularly valuable class of sodium derivatives which can readily be made from olefins, preferably those of the conjugated aliphatic diolefin class, is obtained by reacting them under selective conditions with metallic sodium. Under suitable conditions, the sodium addition products first formed dimerize by coupling to provide a practical synthesis for desirable aliphatic hydrocarbon structures. Thus, the selective reaction of diolefins, such as butadiene, dimethylbutadiene, isoprene, and the methyl pentadienes with elemental sodium gives dimerized disodium derivatives.

One object of this invention is to provide a practical commercial method for converting dimerized olefin derivatives into bis-halomagnesio compounds. These di-Grignard reagents can be further reacted to yield highly valuable, related products.

Another object of the invention is to effectively convert olefinic reactants in one step to the desired di-Grignard reagents in high yields and selectivity. These reagents can be further converted to other valuable derivatives since they readily undergo all typical reactions of Grignard compounds.

A specific object of this invention is to provide a novel and practical method for making bis-halomagnesio octadienes directly from butadiene, sodium, and anhydrous magnesium chloride, at the same time employing the magnesium chloride as a solid attrition agent in the initial reaction between butadiene and metallic sodium.

Other objects will become apparent from the complete description of the invention which is set forth below.

It is further also known that in carrying out the selective dimerization reaction of the diolefinic reactants such as butadiene with metallic sodium a remarkable and unexpected increase in reaction rate and, in effect, an overall increase in the speed of the reaction, can be achieved by the use of a solid friable attrition agent. The use of these agents has been found to give increased utilization of the sodium. That is, the use of an appropriately sized attrition agent and, preferably, one which is capable of undergoing pulverization under the conditions of the reaction, has been found to effect a substantial rise in yield of dimerization products based on the sodium utilized and, at the same time, such use maintains the same high selectivity of dimerization and high yields based on the olefin.

In general, these attrition agents have been inert solid materials, for example, alkali metal salts and metallic and non-metallic oxides which are substantially non-reactive under the conditions of the reaction. Materials such as sodium chloride, sodium sulfate, sand, rutile, graphite, and the like have been employed for this purpose.

It has now been discovered that a new class of chemical compounds, the bis-halomagnesio-dienes, can be obtained by the simultaneous reaction of a conjugated aliphatic diolefin in the presence of an alkali metal and a solid magnesium halide, preferably magnesium chloride. The products of the initial reaction between the unsaturated reactants and the alkali metal are the dimetallo-dienes but the final products are the di-halomagnesio-dienes. Presumably, the alkali metal organic compounds react as rapidly as formed with the magnesium halide present in the reaction mixture although the precise mechanism is not known. These new bis-halomagnesio-dienes undergo all the typical reactions of this type of compounds such as reaction with carbon dioxide to give dibasic acids, reactions with oxidizing agents, epoxides, or carbonyl compounds to give glycols, reactions with sulfur dioxide to give di-sulfinic acids, and the like.

The diolefins which can be used for this improved process include any aliphatic conjugated diolefins, for example, butadiene, isoprene, dimethylbutadiene, the pentadienes, such as the methyl-1,3-pentadienes, and the like. In general, it is desirable to use the aliphatic conjugated diolefins having from 4 to 8, inclusive, carbon atoms. The method is particularly well adapted to the use of butadiene as the diolefin.

The novel di-Grignard compounds obtained by this process from the aliphatic conjugated diolefins can be described by the general formula shown below:

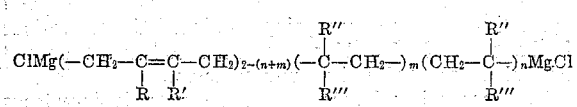

wherein R, R' and R" represent either hydrogen or alkyl radicals, R''' represents an alkenyl radical, and $m$ and $n$ represent whole number integers of from 0 to 1, inclusive.

It is necessary that the alkali metal to be used should be initially in a finely divided form. In general, this requires that the sodium be in a finely dispersed state in a liquid reaction medium. Although either sodium or potassium may be used as the alkali metal reactant, the use of sodium is much preferred over potassium since sodium gives excellent selectivities and yields of dimerized products, and it is cheaper and more readily available. Mixtures of sodium and potassium, and of sodium and calcium can also be used.

A sodium dispersion in which the average particle size is less than 50 microns is quite satisfactory for carrying out the process, the preferred size range being 1 to 10 microns. This dispersion is most conveniently made in an inert hydrocarbon medium as an initial step preliminary to the reaction with the diene compound.

The reaction medium found most suitable for use consists essentially of an ether and only certain types of ethers are effective. These particular classes of ethers appear to have the common property of serving as promoters of the selective dimerization reaction involved. The ether can be any aliphatic mono ether having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of these methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred. Relatively inactive solvents may be present to an appreciable extent without unduly affecting the yield and selectivity of the reaction.

The ether should not contain any groups such as hydroxyl, carboxyl, and the like which are distinctly reactive towards sodium. Although the ether may react in some reversible manner, it must not be subject to extensive cleavage. Such cleavage action destroys the ether, uses up sodium and introduces into the reacting system sodium alkoxides. These alkoxides in turn tend to induce the rubber forming reactions with the unsaturated reactant rather than the desired dimerization reaction.

Although the reaction medium should consist essentially of the specified ethers, other inert media can be present in limited amounts. In general, these inert media will be introduced with the sodium dispersion as the liquid in which the sodium is suspended and will act chiefly as diluents. The concentration of ether in the reaction mixture should at all times be maintained at a sufficient level to have a substantial promoting effect upon the desired dimerization reaction.

It is usually desirable to include in the dimerization reaction mixture at least one supplementary activating material. This material is a relatively small amount of at least one material from the class of polycyclic aromatic compounds. By this term it is intended to include both condensed ring hydrocarbons such as naphthalene and phenanthrene, as well as the uncondensed polycyclic compounds such as diphenyl and the terphenyls and their mixtures which have also been found to be particularly useful. The amount of the hydrocarbon to be used will vary over a range which in every case will be relatively small in comparison with the amount of diolefin or vinyl aromatic compound undergoing reaction. Concentrations in the range of 0.1 to 10 wt. percent based on the amount of diolefin are ordinarily quite sufficient.

The magnesium halide preferred for use is anhydrous magnesium chloride, since it is relatively more stable, readily obtainable and available at low cost. It is especially necessary that it be employed in an anhydrous state. The anhydrous salt can be added to a pebble mill or ball mill or other type attrition reactor in contact with the solid dispersed metallic sodium and the reaction medium wherein the salt is simultaneously ground down to an effective particle size. Or, the magnesium salt can be preground before introduction to the mill and/or before introducing sodium and other reactants. The former method is to be preferred in larger scale industrial operations since the reaction of the sodium with the conjugated diolefin can be initiated substantially simultaneously with the start of the grinding action.

Amounts of the magnesium salt equivalent to at least one mole per mole of the original olefinic reactant used are necessary and, generally, quite satisfactory. Somewhat larger amounts are effective to obtain good results for using the salt as an attrition agent throughout the entire reaction period.

It is a further requirement in the process that the reaction temperature throughout the entire process preferably be held between $-40°$ C. and $+40°$ C. The temperature range between 0° and $-40°$ C. is the preferred one. Generally speaking, all ethers begin to yield cleavage products at temperatures of about 0° C. and above with the result that sufficient alkoxides are formed to yield unwanted by-products rather than the required dimers.

A typical reaction using the process of the invention is carried out by placing an inert hydrocarbon such as isooctane in a suitable vessel with the appropriate amount of sodium metal. The mixture is heated in surrounding bath or otherwise until the sodium has melted (M. P. 97.5° C.). Then a suitable high speed agitator is started and, preferably, an emulsifier consisting, for example, of ½% (based on sodium) of the dimer of linoleic acid, is added. After a short period of agitation a test sample of the dispersion shows the particle size to be in the 5–15 micron range.

The stirring is stopped and the dispersion is allowed to cool to room temperature. This dispersion is now ready to be used in the preparation of the di-Grignard type compounds. Inert liquids such as saturated dibutyl ether normal octane, n-heptane, or straight run kerosenes, may be employed as suspension media for the dispersion. Any such dispersion having sufficiently finely divided sodium will suffice. Other well-known substances may be used instead of the dimeric linoleic acid as the dispersing agents. This sodium dispersion is preferably added to a selected ether which is precooled to and maintained between 0° C. and $-40°$ C. It is only necessary to employ an amount of dispersed sodium stoichiometrically equal to the appropriate olefinic reactant to be initially dimerized. The solid magnesium chloride is also added to the mixture. The diolefin reactant compound is preferably introduced slowly. One method is to introduce this reactant into the reaction vessel at approximately the same rate as that at which it reacts with the metallic sodium and magnesium chloride. It is highly desirable to maintain constant agitation within the reaction mixture. In order to take advantage of the maximum effect of the presence of the solid magnesium halide, the most effective agitation is to be achieved by conducting the reaction in a ball mill, pebble mill or similar mill suitable for wet grinding.

The separation of the products can be made by relatively simple and well-known chemical means. The di-Grignard derivatives can either be isolated as such, or they can be directly and immediately thereafter used as chemical intermediates and subjected to further reactions to form valuable derivatives. For instance, subsequent carbonation of the mixture containing these products yields the salts of dicarboxylic acids. The carbonation may be done by subjecting the di-Grignard derivatives to dry gaseous carbon dioxide, by contact with solid carbon dioxide or by means of a solution of carbon dioxide. In general, carbonation of the di-Grignard derivatives can be done at somewhat higher temperatures, which offers advantages over the necessary low-temperature carbonation of certain other types of metallo organic compounds. The carbonation forms the dimetallic salts of the unsaturated aliphatic dicarboxylic acids. These salts contain two more carbon atoms than the dimetallic diene dimers from which they are produced.

Where butadiene is the starting aliphatic diolefin and sodium is employed without magnesium chloride as an additional reactant, there results on carbonation the selective production of C-10 unsaturated dicarboxylic acids, comprising an isomeric mixture of 3,7-decadiene-1, 10-dioic acid, 1,7-decadiene-3, 6-dioic acid and 1,6-decadiene-3,10-dioic acid in the ratio of 3.5/1/5. The present invention is of particular importance in that the carbonation of the products of the di-Grignard type yields a mixture of dibasic C-10 unsaturated acids containing substantially less straight chain molecules. Thus, the ratio of 3,7-decadiene-1,10-dioic acid, 1,7-decodiene-3,6-dioic acid and 1,6-decadiene-3,10-dioic acid is 2.5/3/4. The larger amount of the 1,7-decadiene-3,6-dioic acid (2,5-divinyladipic acid) is especially important since this acid is the most valuable in the preparation of drying oils and alkyd resins.

The Grignard groupings formed undergo all typical reactions common to these compounds. They undergo reaction with carbonyl compounds such as aldehydes and ketones to form glycols. They also react with epoxides to give glycols. Many other reactions are well known for these derivatives. Of particular interest is the reaction of the di-Grignard reagents with oxygen to give glycols and with chloramine to give diamines.

The unsaturated products resulting directly therefrom find use as chemical intermediates, and are valuable in the preparation of drying oils, polymers, copolymers, and plasticizers. The resultant diacid and glycol derivatives are useful in the formation of esters, polyesters, polyamides and generally as chemical intermediates.

The unsaturated derivatives can be hydrogenated at the double bonds to yield the corresponding saturated compounds, particularly the saturated diacids and saturated glycols. For example, the di-Grignard product obtained from butadiene ultimately yields after carbonation and hydrogenation a practically quantitative mixture of sebacic, 2-ethylsuberic, and 2,5-diethyladipic acids. It is of especial value to note that when operating in this manner and by this process, a much larger proportion of 2,5-diethyladipic acid is obtained in the final mixture than when the isomeric mixture is obtained via other routes.

The presence of the carbon to magnesium bond is demonstrated by the analogous reactions of phenylsodium and phenylmagnesium chloride from which the products are well-known and easily identified. When phenylsodium is prepared in toluene and the reaction mixture refluxed for two hours after the formation of the phenylsodium is complete, benzylsodium is formed quantitatively. Carbonation gives only phenylacetic acid. If carbonation is effected before the reflux period, only benzoic acid is obtained. It is known that Grignard reagents will not effect metalation reactions and thus phenylmagnesium chloride will not metalate toluene to give benzylmagnesium chloride. Accordingly, when chlorobenzene was added to a mixture of metallic sodium and magnesium chloride in toluene, phenylmagnesium chloride was formed. The reaction mixture was refluxed for two hours and carbonated by pouring over solid carbon dioxide. Only benzoic acid was obtained whereas if benzylsodium were present by a metalation reaction between phenylsodium and toluene, phenylacetic acid would have resulted. Thus, it was shown that the phenylsodium reacted with the magnesium chloride as rapidly as formed to give phenylmagnesium chloride.

In a similar manner, it can be shown that, during the process described herein, there is a carbon to magnesium bond formed resulting in the Grignard type grouping, and producing thereby the di-Grignard derivatives. Thus, it was shown that disodiooctadiene would metalate triphenylmethane to give triphenylmethylsodium which on carbonation gives triphenylacetic acid. When magnesium chloride was present and the di-Grignard reagent formed, no metalation of the triphenylmethane could be noted.

The invention will be described in greater detail by the following examples. These examples and embodiments are illustrative only and the invention is not in any way intended to be limited thereto except as indicated by the appended claims. All parts are expressed by weight unless otherwise specified.

Example 1

Disodiooctadiene was prepared by adding 112 parts (2.0 moles) butadiene to 46 parts (2.0 g. atoms) of dispersed sodium in 500 parts dimethyl ether solvent containing 2 parts of o-terphenyl at −30° C.; the estimated yield of disodiooctadiene from the reaction was 0.75 mole. Carbonation of the reaction mixture on solid carbon dioxide followed by acidification and hydrogenation gave 75% yield of a mixture of 10 carbon atom dibasic acids. The composition of this mixture consisted of essentially 38 parts of sebacic acid, 50 parts of α-ethylsuberic acid and 12 parts of α,α'-diethyladipic acid.

Example 2

To a mixture of 46 parts (2.0 g. atoms) of sodium (a 50% dispersion in isooctane) and 190 parts of anhydrous magnesium chloride and 1500 parts of dimethyl ether containing 4 parts of o-terphenyl carrier at a temperature of −23° C., was added over a period of one hour, 108 parts (2.0 moles) of butadiene. Carbonation of the resulting bis-chloromagnesio octadiene on solid carbon dioxide followed by hydrogenation and acidification gave a 60% yield of a mixture of dibasic acids. The mixture of acids consisted of 28 parts sebacic acid, 42 parts of α-ethylsuberic acid and 30 parts of α,α'-diethyladipic acid.

Example 3

Disodiooctadiene was prepared by adding 112 parts of butadiene to 46 parts of sodium dispersed in 500 parts of dimethyl ether solvent containing 2 parts of o-terphenyl at −30° C.; the estimated yield of disodiooctadiene from the reaction was 0.75 mole. Color Test I (ref. 1, Gilman and Schulze, J. Am. Chem. Soc. 47, 2002 (1925)), which depends upon the addition of any organometallic compound to Michler's ketone, showed the presence of the organosodium compound, Color Test II (ref. 2, Gilman and Swiss, J. Am. Chem. Soc. 62, 1847 (1940)), which distinguishes between organolithium or organosodium compounds and Grignard reagents by metalation of triphenylmethane, showed the presence of the organosodium compound. The triphenylmethyl sodium that resulted from this latter test was carbonated on solid carbon dioxide and a melting point sample of tri-phenylacetic acid (M. P. 262–264° C.) was obtained. To the reaction mixture containing disodiooctadiene was added an equimolar amount of magnesium chloride and the reaction mixture stirred in the ball mill reactor for 1 hour. At the end of this time Color Test I (ref. 1) was positive, showing the presence of an organometallic compound presumably the di-Grignard reagent, while Color Test II (ref. 2) was negative, indicating that the disodiooctadiene had been completely converted to the bischloromagnesiooctadiene. Carbonation of this reaction mixture on solid carbon dioxide gave a 70% yield of a mixture of 10-carbon atom dibasic acids.

What is claimed is:

1. The process which comprises preparing an unsaturated di-Grignard reagent by contacting an aliphatic conjugated diolefin with dispersed sodium metal, and in the presence of solid anhydrous magnesium chloride in an ether containing reaction medium, at a temperature between −40° C. and +40° C., thereby forming the corresponding di-Grignard derivatives of the unsaturated hydrocarbon dimers of said diolefin.

2. The process according to claim 1 in which the aliphatic conjugated diolefin is butadiene.

3. The process which comprises continuously agitating in an attrition reactor an aliphatic conjugated diolefin with dispersed sodium metal in a methyl ether reaction medium in the presence of from 0.1 to 10 wt. percent, based on the diolefin, of a polycyclic aromatic hydrocarbon and in the presence of solid anhydrous magnesium chloride while maintaining a temperature between +40° and −40° C., thereby forming the corresponding di-Grignard derivatives of the unsaturated hydrocarbon dimers of said diolefin.

4. The process according to claim 3 in which the aliphatic conjugated diolefin is butadiene.

5. The process which comprises reacting in an attrition reactor an aliphatic conjugated diolefin with dispersed sodium metal in a methyl ether reaction medium in the presence of a small amount of a polycyclic aromatic hydrocarbon and in the presence of solid anhydrous magnesium chloride, at a temperature between 0° and −40° C., thereby forming the corresponding di-Grignard derivatives of the unsaturated hydrocarbon dimers of said diolefin, and directly thereafter carbonating said derivatives thereby forming the aliphatic unsaturated dicarboxylic acids having two more carbon atoms than the said unsaturated hydrocarbon dimers.

6. The process according to that described in claim 5 in which the conjugated diolefin is butadiene.

7. The process which comprises preparing an unsaturated di-Grignard reagent by reacting the disodio derivatives of the unsaturated hydrocarbon dimers of an aliphatic conjugated diolefin with solid anhydrous magnesium chloride in an ether containing reaction medium, at a temperature between −40° and +40° C., thereby forming the corresponding di-Grignard reagent of the unsaturated hydrocarbon dimers of said diolefin.

8. The process according to claim 7 in which the aliphatic conjugated diolefin is butadiene.

9. The process which comprises agitating in an attrition reactor the disodio derivatives of the unsaturated hydrocarbon dimers of an aliphatic conjugated diolefin with solid anhydrous magnesium chloride in a methyl ether reaction medium, thereby forming the corresponding di-Grignard derivatives of the unsaturated hydrocarbon dimers of said diolefin.

10. The process according to claim 9 in which the aliphatic conjugated diolefin is butadiene.

11. A composition of matter comprising at least one unsaturated di-Grignard derivative having the formula:

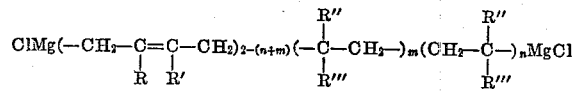

wherein R, R' and R'' represent substituents selected from the group consisting of hydrogen and alkyl radicals, R''' represents an alkenyl radical, and $m$ and $n$ represent whole number integers selected from the group consisting of 0 to 1, inclusive.

12. A composition of matter comprising bis-1,8-chloromagnesio-2,6-octadiene.

13. A composition of matter comprising bis-1,6-chloromagnesio-2,7-octadiene.

14. A composition of matter comprising bis-3,6-chloromagnesio-1,7-octadiene.

15. A composition of matter comprising a mixture of bis-chloromagnesio-octadienes.

16. A process, as defined in claim 1, wherein the sodium reactant is a dispersion of sodium having an average particle size of less than about 50 microns.

17. As a new composition, a reaction mixture, obtained from the process of claim 1, containing a di-Grignard derivative of the dimer of the diolefin.

18. As a new composition, a reaction mixture, obtained from the process of claim 1 in which butadiene is the diolefin reactant, containing bis-1,8-chloromagnesio-2,6-octadiene, bis-1,6-chloromagnesio-2,7-octadiene, and bis-3,6-chloromagnesio-1,7-octadiene.

References Cited in the file of this patent

"Organic Chemistry," Gilman, vol. 1, pages 443 and 459 (1938), John Wiley and Son, New York.

"Handling Sodium in Organic Reactions," vol. 2, Hansley, Ind. & Eng. Chem., pages 1759 to 1766, vol. 43, No. 8, August 1951.